Re. 24580
Nov. 12, 1957
R. F. HODGSON
2,812,775
STABILIZING MEANS FOR HIGH PRESSURE HYDRAULIC
VALVES OF THE PLUNGER TYPE
Filed Sept. 10, 1956
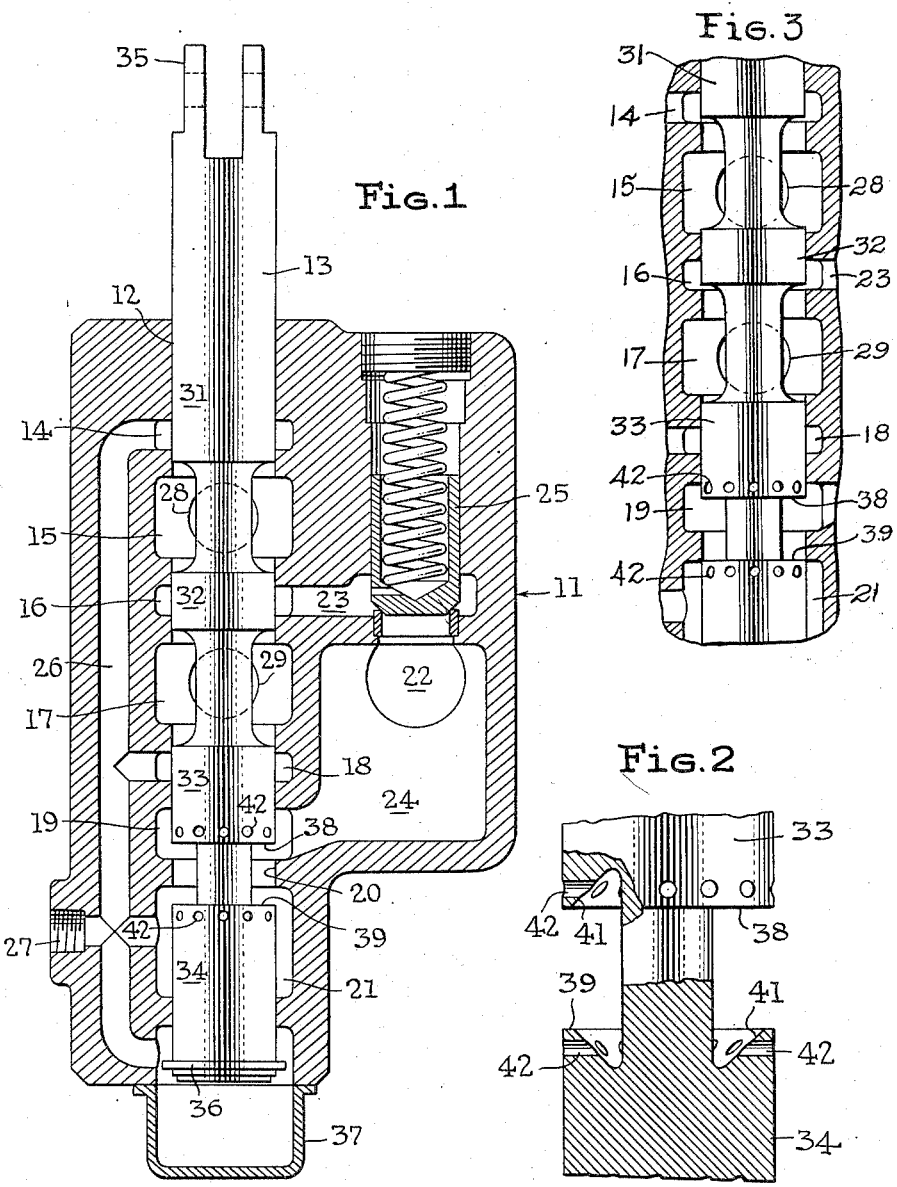
INVENTOR
Robert F. Hodgson
BY
ATTORNEYS _United States Patent Office_

2,812,775
Patented Nov. 12, 1957

2,812,775

STABILIZING MEANS FOR HIGH PRESSURE HYDRAULIC VALVES OF THE PLUNGER TYPE

Robert F. Hodgson, Kalamazoo, Mich., assignor to The New York Air Brake Company, a corporation of New Jersey Application September 10, 1956, Serial No. 608,787

7 Claims. (Cl. 137—620)

This invention relates to plunger valves, and more particularly, to an improvement therein for substantially relieving the unbalanced axial forces resulting from the dynamic reaction of the fluid flowing therethrough.

Most of the plunger valves in use today, employ a movable plunger having one or more longitudinally spaced lands of relatively large diameter separated by necked-down regions of relatively small diameter. The annular shoulders presented by these lands, between the outer surface and the surface of the reduced portion, normally comprise a small radius fillet at the neck and a flat face perpendicular to the axis of the plunger. This flat face meets the outer surface of the land at an angle of 90°, thus forming a sharp control edge.

These plungers are used in conjunction with seat lands of similar shape defined in the bore of the valve housing by annular grooves. These encircle the cylindrical bore which receives the plunger. The control edge of the plunger land and the square edge of the associated fixed seat land, constitute an adjustable annular orifice, the width of which determines the degree of communication between flow chambers disposed adjacent each side of the fixed land.

Fluid which flows between the chambers through the adjustable orifice and across the fixed land, experiences a change in momentum regardless of the direction in which it flows, and this change in momentum is accompanied by a corresponding dynamic reaction upon the plunger. Since it is well known today that the direction of flow through these adjustable orifices is not parallel with the end face of the land but rather is at an angle to such face, it becomes obvious that this reactive force will have components in both the radial and axial directions. If the port is a complete annulus, the radial components will balance out but the axial components will remain unbalanced.

Up to this time, various attempts have been made to compensate these axial forces or to eliminate them entirely, but since the problem has evaded mathematical statement, the solutions have not been altogether satisfactory. It has been determined however, that such quantities as velocity, pressure drop and rate of flow, cause the development of these forces. Influenced by these findings, the prior art discloses the use of throttling grooves, notches and chamfers placed on the edge of the plunger land, in an effort to reduce the effect of one or more of these variables. These expedients have met with varying degrees of success, but the problem still persists.

The object of this invention is to provide an improved plunger valve in which the axial forces are substantially balanced. Briefly, the invention involves the provision of a separate flow path through the plunger itself which is in parallel flow relation with, but completely distinct from, the normal path across the edge of the plunger land. In its preferred form, this second path comprises an undercut in the face of the plunger land beneath the control edge and a plurality of small-diameter radially-extending passages communicating between this undercut and the peripheral surface of the plunger land at points axially displaced from the control edge. The effect of this path is twofold: First, it by-passes a portion of the flow and consequently reduces the momentum of the fluid flowing through the adjustable orifice, thereby decreasing the reactive force on the plunger and, of course, the axial component thereof. Second, the fluid which is diverted is conveyed to the downstream chamber along a path normal to the plunger axis and consequently produces a substantially radial reactive force on the plunger. In the case of a symmetrical series of radial passages, this latter force is completely balanced, thereby eliminating possible binding of the plunger in the bore.

In actual comparison tests of this arrangement with the grooves, notches and chamfers of the prior art, it was shown that the present structure affords vastly superior performance.

The invention will now be described as embodied in a known type of open-center plunger valve, for controlling a double-acting motor, said valve having a normal or centered position in which it hydraulically locks the motor and unloads the system by connecting the main supply and exhaust flow connections, two motor-energizing circuit-loading positions in which, respectively, it charges a selected working space of the motor while exhausting the other working space, and a float position in which it connects both working spaces of the motor to exhaust.

The invention will be shown embodied in the two control edges of the open center, because here the heaviest flows and greatest changes of pressure occur.

In the drawings:

Fig. 1 is an axial section of a simplified valve in its normal position.

Fig. 2 is a fragmentary view part in elevation and part in section, showing on an enlarged scale the control edges of the plunger which perform the unloading and loading functions, and embody the significant feature of the invention.

Fig. 3 is a fragmentary view showing a control edge of the valve as it engages the seat land.

Referring to the drawing, the invention is shown incorporated in a plunger valve which comprises a housing 11 having a through cylindrical bore 12 which snugly but slidably receives the plunger element 13. The housing 11 contains annular chambers 14, 15, 16, 17, 18, 19 and 21 each of which encircles the through bore 12 and which are separated by seat lands as shown. The chambers 16 and 19 communicate with inlet port 22 via passages 23 and 24 respectively; the passage 23 having conventional check valve 25 disposed therein. The chambers 14, 18 and 21 communicate with the common return passage 26 which connects them to the return connection 27. Chambers 15 and 17 are connected to motor ports 28 and 29 for controlling a reversible fluid motor (not shown) as hereinafter described.

The plunger element 13 comprises lands 31, 32, 33 and 34 separated by reduced diameter or necked-down portions, as shown. At its upper end, the plunger is formed with a suitable fork 35 for connection to actuating means (not shown) and at its lower end carries a shoulder 36 for limiting the upward travel of the plunger. The downward travel of the plunger is limited by closure cap 37 which is secured to the housing 11 by any suitable attaching means (not shown) and which abuts the end of the plunger in the lowermost position.

The edges 38 and 39 of the lands 33 and 34 respectively, have been modified in accordance with the preferred form of this invention. Referring to Fig. 2, which is an enlarged view of these edges, the land 34 contains a conical undercut 41 leading inward from the edge 39. This undercut portion is connected to the peripheral surface of land 34 by a uniform series of radial passages 42 which extend through the land at a point remote from the control edge 39. From the drawing, it will be understood that the edge 38 of land 33 is modified in exactly the same way.

In operation, the ports 28 and 29 are connected to opposite sides of a reversible fluid motor and the return port 27 is connected to a suitable reservoir. Fluid under pressure from suitable pumping means is supplied to inlet connection 22 whence it flows via passage 24, chambers 19 and 21, and return port 27 back to the reservoir. The unloading flows between passage 24 and chamber 19 occur along two separate paths; part of the fluid crossing the edge 38 of land 33 and the balance flowing into radial passages 42 and out through the recess 41. Similarly, part of the fluid entering chamber 21 crosses the edge 39 and the remaining portion flows into recess 41 and out through radial passages 42 of the land 34. As shown, the valve is in the neutral position and the pump is being unloaded. In most commercial applications, the plunger-actuating mechanism which is connected to the fork 35 would include a centering spring device for biasing the plunger to this position.

Movement of the plunger in the upward direction, displaces plunger land 32 from the neutral position in which it overlies chamber 16, thereby connecting this chamber with chamber 17 and motor port 29. At the same time, valve land 31 opens communication between chambers 14 and 15 so that the other side of the fluid motor, communicating with port 28, will be connected to the return line via passage 26 and port 27.

This upward movement of the plunger also causes edge 39 of the land 34 to move toward the seat land 20, thus decreasing the size of the adjustable orifice between chambers 19 and 21. In prior valves, not having the benefit of the present invention, the axial component of the reactive force at an adjustable orifice such as is defined by the lands 20 and 34 would balance the biasing force of the plunger-actuating spring device at a point just prior to complete interruption of the flow between chambers 19 and 21. In effect, this incomplete closure of the valve produced an intermediate position of the plunger in which some fluid flowed through the small restricted opening. This restricted flow caused a rise in the temperature of the hydraulic fluid and gave the valve poor control characteristics.

In the present valve, because of the parallel flows through the recess 41 and the radial passages 42, the axial component of the reactive force at the port is substantially reduced and consequently the tendency to stall in the intermediate position of the plunger is eliminated. In this case, the plunger moves upward the entire distance permitted by shoulder 36, thereby allowing the edge 39 and the radial passages 42 to be completely enclosed within the fixed land 20.

In this uppermost position of the plunger, the flow to chamber 21 is completely shut-off and the chambers 16 and 17 and motor port 29 receive the total volume of fluid entering inlet port 22. Since one side of the fluid motor is now pressurized and the other is connected to the return line, the motor will move in the first of its two directions.

If the plunger is now displaced downward so as to permit chambers 15 and 16 to communicate across the upper edge of land 32, the fluid motor will operate in the reverse direction; the previously pressurized side thereof being connected to the return line via port 29, chambers 17 and 18, and passage 26. In moving to this position, the edge 38 of land 33 now coacts with the fixed land 20 in the same way as previously described with respect to the edge 39 of land 34. As in the previous case, the axial component of the reactive force at an adjustable orifice such as is defined by the lands 20 and 34 balanced the spring bias of the actuating mechanism at a point just prior to complete interruption of the flow to chamber 21. Incorporation of the present invention in the land 33 relieves the problem in the same way as in the case of land 34. The significant difference in operation between these two installations is the direction of flow through the radial passages 42; and this has no effect on the function of the invention or on the results obtained therefrom, except as to the relative magnitude of the forces.

If the plunger is now moved to its lowermost position, into abutment with casing 37, the land 32 will move completely within the chamber 17, thus interconnecting chambers 15 and 17 and their associated ports 28 and 29. In this position of the plunger, the land 33 will continue to block the return flow to chamber 21 but since the upper edge of this land now permits flow between chambers 18 and 19, the pump will be unloaded. This position of the plunger is commonly called the float position, as the fluid motor can be manually moved in either direction without resistance from the pressure fluid.

Since, in the normal applications of the valve, the return line from port 27 to the reservoir in the unloading position, is relatively unrestricted, the rate of flow of fluid from chambers 19 and 21 to the reservoir is quite high. Consequently the unbalanced axial forces across the land 20 is large. For this reason, the invention has been applied to the land edges 38 and 39 which control this port. It should be understood, however, that the invention could also be used on all of the edges of the plunger lands, though the results realized would not be as impressive since the momentums and force unbalances are not as great.

In summary, it is important to note that the passages 42 need not extend through the land in radial directions. The critical requirement is that they all be in a plane or planes normal to the axis of the plunger. Further, it is of the essence of the invention that these passages be axially displaced from the control edge of the land so that a completely distinct flow path is formed. The magnitude of this displacement is, to a large extent, governed by the angle of the conical surface 41, since passages with small width-to-length ratios will give flows which are more nearly perpendicular to the axis of the plunger, thereby avoiding undesirable axial forces.

It should be understood that the invention has been shown and described only in its preferred form and that the scope of the inventive concept should not be limited in any respect except in accordance with the following claims.

What is claimed is:

1. In a valve, the combination of a housing having a cylindrical bore and two axially spaced flow chambers intersecting said bore; a cylindrical seat land encircling said bore and interposed between said two flow chambers; a plunger slidably mounted in said bore and having a peripheral control edge which coacts with said seat land to form a variable area flow path between said chambers; means for moving said plunger between a first position in which the variable flow path is completely closed and a second position in which said flow path is opened a predetermined maximum amount; and a separate flow path formed in said plunger for providing parallel flow between chambers, said separate path comprising a first portion extending axially inward from the end face of the plunger beneath said control edge and a second portion extending in a direction normal to the axis of the plunger from said first portion through the surface of the plunger at a point axially remote from the control edge.

2. The combination defined in claim 1 in which the second portion of said separate flow path comprises a circumferential series of radially-extending passages.

3. The combination defined in claim 1 in which the second portion of said separate flow path comprises a circumferential series of radially-extending passages arranged such that they are closed by said cylindrical valve land during a portion of the limited movement of said plunger.

4. The combination defined in claim 1 in which the first portion of said separate flow path comprises a conical recess and the second portion of said path comprises a circumferential series of radially-extending passages.

5. The combination defined in claim 2 in which the axial dimension of said radial passages is small in relation to the length of said passages.

6. In a valve, the combination of a housing having a bore for a plunger and two chambers communicating with said bore and located on opposite sides of a plunger-fitting land, there being means supplying pressure liquid to one of said chambers and means venting the other chamber; a plunger movable axially in and fitting said bore and said land, said plunger having a groove serving to bridge said land when the plunger is in its mid position and thus connect the chambers, said groove affording opposed control edges on the plunger which may selectively overtravel control edges on said land to isolate said chambers when the plunger is displaced from said mid position, there being flow passages which lead from said groove through said plunger to the periphery of the plunger, said passages each including a terminal portion which lies in a plane normal to the axis of the plunger, the terminal portions being so located as to be closed by said land only when the plunger is moved from mid position a distance greater than that which causes a control edge on the plunger to overtravel a control edge on said land.

7. In a valve, a housing having a cylindrical bore, two flow chambers communicating with said bore, and a seat land encircling said bore and separating said chambers; a plunger movable in said bore and having peripheral control edges which coact with said land to define variable area flow paths, means for moving said plunger between a first and second position in each of which the variable flow path is completely closed, and at least one position between the first and second positions in which said flow path is open; and separate flow passages formed in said plunger for affording flows between said chambers, said separate flow passages each comprising a first portion extending inward beneath one of said control edges and a second portion extending in a direction normal to the axis of the plunger from said first portion through the surface of the plunger at a point spaced from the control edge.

No references cited.